United States Patent [19]
Poppe et al.

[11] 3,747,107
[45] July 17, 1973

[54] FREQUENCY LOCKING SYSTEM FOR DIRECTION FINDERS

[75] Inventors: Dag Poppe, Gjettum; Odd Mathiesen, Oslo; Christian Fredrik Holmboe, Hosle, all of Norway

[73] Assignee: International Standard Electric Corporation, New York, N.Y.

[22] Filed: May 5, 1972

[21] Appl. No.: 250,519

[30] Foreign Application Priority Data
May 7, 1971   Norway.............................. 1734/71

[52] U.S. Cl. ............................. 343/113 R, 343/119
[51] Int. Cl. ............................................... G01s 3/04
[58] Field of Search ....................... 343/113 R, 119

[56] References Cited
UNITED STATES PATENTS
3,681,707   8/1972   Bean .............................. 343/113 R Primary Examiner—Benjamin A. Borchelt
Assistant Examiner—Richard E. Berger
Attorney—C. Cornell Remsen, Jr., Thomas E. Kristofferson et al.

[57] ABSTRACT

A local oscillator control device particularly for loop antenna direction finding equipment. Two equipment modes are provided, one for tuning and frequency surveillance and another for bearing determination, are provided. The local oscillator (LO) is manually controlled and also voltage controlled, the voltage control being imperative during tuning ("Frequency" mode) but operates to stabilize the LO when the "Bearing" (reading) mode is enabled, within predetermined limits. The circuits operate to revert the mode from "Bearing" to "Frequency" whenever the manual LO tuning is activated or a predetermined drift limit is exceeded.

5 Claims, 2 Drawing Figures

FREQUENCY LOCKING SYSTEM FOR DIRECTION FINDERS

CROSS REFERENCE TO RELATED APPLICATIONS

This application is filed under the provisions of 35 U.S.C. 119 with claim for the benefit of the filing of an application covering the same invention filed May 7, 1971, Ser. No. 1734/71, in Norway.

BACKGROUND OF THE INVENTION

1. Field of the Invention

The present invention relates generally to automatic direction finding equipment and in particular, to timing stablization of such systems.

2. Description of the Prior Art

In the prior art, direction finding equipment of the loop antenna type has been extensively used. An early description of such equipment in the basic form in which it is practiced, albeit with various improvements and added features, was given in the well known "Radio Engineers' Handbook," by. F. E. Terman, 1943. U.S. Pat. applications Ser. No. 210,870 filed Dec. 22, 1971, and Ser. No. 212,531, filed Dec. 27, 1971, both of which are assigned to the assignee of the present application, describe some pertinent improvements to this art.

In addition to the aforementioned improvements, there exists a need for improved short term stability of timing of such equipment, especially where it is tuned to a relatively narrow band in order to exclude extraneous signals to make accurate bearing measurement of the source of a selected signal. Thus, it is a significant disadvantage if local oscillator drift results in timing loss or deterioration during the time measurements are being made. Ordinary automatic frequency control (AFC) techniques are not applicable because of the need for various tune lock release features, such as tuning to a new station.

Although the problem is amenable to such solutions as crystal controlled frequency synthesizers, such circuits are relatively complex and expensive. Moreover, when digital frequency read-out is used, long term frequency stability is not required.

The manner in which the present invention improves the devices of this art will be understood as this description proceeds.

SUMMARY

The present invention may be said to have as its general object the provision of effective but flexible control circuitry for use on direction finding equipment of the type described. The arrangement allows for selection of frequency or bearing determination using the same digital read-out without disturbing the frequency locking.

The invention is well suited for dual-channel, automatic direction finders which include a pair of orthogonally oriented loop antennas and a reference (sense) antenna arrangement, and which are adapted for alternative operation in "Frequency" or "Bearing" modes. In the former mode, the receiver local oscillators are variably tuned for signal searching and in the latter mode, a bearing measurement is made on the source of the selected signal.

It is an important feature of the present invention that a local oscillator locking device is actuated by setting the direction finder to its "Bearing" condition, the locking only being effective as long as the oscillator frequency does not vary more than a predetermined amount during a predetermined time period. If LO variations exceeding said amount occur, the locking device is automatically released and the direction finder is set back to its "Frequency" condition for returning.

By introducing such a frequency locking system, an inexpensive and effective direction finder improvement is effected. The ease with which correct bearings are taken during warm-up of the equipment and also during varying environmental conditions is enhanced.

A practical simplification of the circuits is achieved by the expendient of comparing the output of the local oscillator in locked-in condition at regular time intervals with a value stored in a frequency storing circuit. That circuits is locked by actuating switching means, when the oscillator is tuned to a desired frequency. Only the least significant digits of the oscillator frequency in digital form are stored and compared with corresponding digits of the instantaneous oscillator frequency. The number of digits employed is chosen in accordance with the corresponding maximum expected frequency drift between two measurements, and in consideration of the desired lock-out efficiency of the locking device.

Above mentioned and other features and objects of the present invention will be understood from the following detailed description of embodiments of the invention taken in conjunction with the drawings.

DESCRIPTION OF THE PREFERRED EMBODIMENTS

Figure 1:
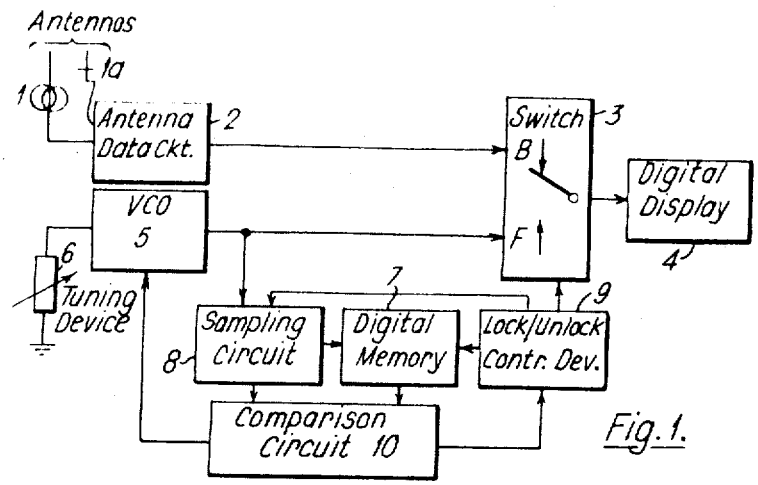
FIG. 1 is a block diagram of the circuit of one embodiment of the invention.

Referring now to FIG. 1, the orthogonally related twin loop antennas and a sense antenna 1a are indicated. Signals from these antenna circuits are treated at predetermined time intervals in a bearing and sense antenna information handling circuit 2, as in the prior art. The direction finder described may be set to the "Bearing" condition or to the "Frequency" condition by switching means 3 and the resulting information shown on digital display unit 4. Actually, additional information such as "Gyro," as well as "True bearing" and "Relative bearing" may also be shown on the display, but these alternatives are not a part of the present invention and are not essential for understanding of the present invention. Accordingly, they will not be considered here.

A local oscillator 5, hereinafter called VCO (voltage controlled oscillator) is used for controlling the received frequency of the direction finder and its frequency is primarily adjusted at a tuning device 6. When the direction finder is set to its "Frequency" condition, the tuned-in frequency is continuously monitored on the digital display 4. The VCO 5 will therefore normally be adjusted manually until the desired frequency is read on the display 4. During warm up of the equipment and also under certain environmental conditions, the oscillator frequency may drift, but such drift is compensated for by comparing the desired frequency with the actual frequency, and controlling the VCO 5 in accordance with the measured result.

In FIG. 1 the VCO output is applied to a memory 7 and a sampling circuit 8. The memory 7 is actuated by a locking/unlocking control device 9 to memorize the selected least significant binary digits (four for example) of the frequency counted from the VCO 5 during the sample, at which time the desired frequency is being read on the display 4. At regular time intervals thereafter, similar samples of the VCO-signal are taken and comparison is performed in a comparison circuit 10. As long as the frequency drift is within predetermined limits, a compensating control voltage is applied to the VCO 5 from the comparison circuit to return it to the nominal selected frequency. However, if the drift detected between two measuring periods, which may be of the order of 0.1 second typically, exceeds said limits, the comparison circuit 10 controls the locking-/unlocking circuit 9 to release the locking of the memory 7, and to set the switch means 3 to the "Frequency" condition. Bearings may thereafter be taken at the new frequency which is displayed, by actuating the memory 7 which during the next measurement (after e.g. 0.1 second) will contain information about the new frequency. Or the VCO may be manually tuned back (at 6) to the originally chosen frequency before the memory and locking is actuated again.

It will be realized that manual tuning of 6 would be recognized as a "drift" thereby automatically unlocking the VCO tuning compensation form circuit 10.

Figure 2:
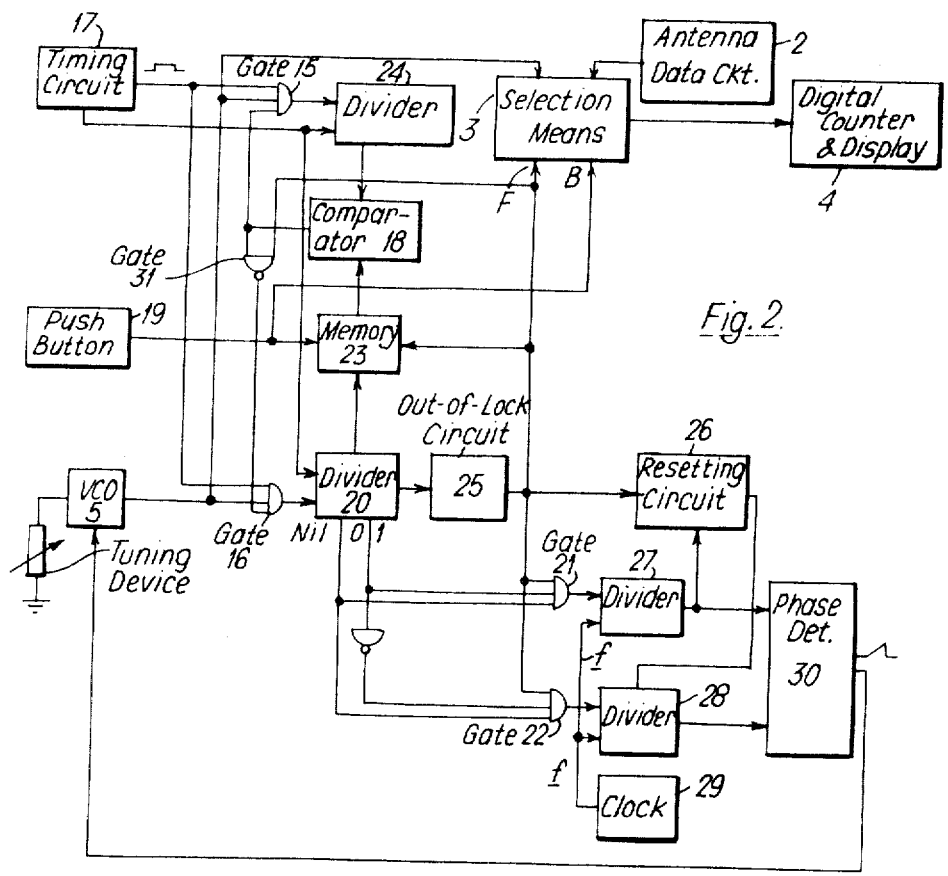
FIG. 2 shows a more detailed block diagram representing an alternative embodiment of the invention.

In FIG. 2 a more detailed form of the invention is presented. The bearing and sense information treating (antenna data) circuit 2 is as in FIG. 1 connected to selection means 3. Although the antennas are not illustrated in FIG. 2, they are, of course, equivalently associated with circuit 2 as in FIG. 1. Similarly the VCO 5, which is manually tuned by the tuning device 6, is connected to selection means 3 in a manner which will be hereinafter evident. The means 3 may, as described, be set to a "Frequency" condition in which the tuned-in frequency is shown on the digital display 4, or to a "Bearing" condition in which the bearing of the tuned-in signal is shown on the display. The function of the circuit blocks 7–10 of FIG. 1 are described in greater detail in FIG. 2.

The VCO signal output is gated in gates 15 and 16 by a time pulse from a timing circuit 17, so that at the output of these gates occur signal samples each indicative of the VCO-frequency. In the unlocked condition of the circuitry, the gate 16 is open all the time in accordance with a control operation to be described.

The signal sample (or pulse sample) is thus applied to a divider circuit 20. This circuit has a period of N pulses so that, at the end of each sample, only the remainder beyond N will appear. The circuit 20 may, for instance, be a four-stage counter so that only the four least significant bits of the VCO frequency representing number will remain. This four digit binary number is passed on to a memory 23 and further on to the comparator 18 in which it is compared with the output digital number of another four bit divider circuit 24. The output of the comparator 18 is, however, in this unlocked condition of the circuitry, blocked by the gate 31 so that the gate 16 is only controlled by the timing pulses from 17. An output signal from the divider circuit 20 controls an out-of-lock circuit 25 which, in turn, has several control functions as follows: First, it controls the state of the means 3 to be in the "Frequency" condition, Second, it controls the unlocking condition of the memory 23, also controls the gate 21, 22 and 31. Finally, it controls a resetting circuit 26 to insure that divider circuit 28 is reset to the predetermined state. These divider circuits 27 and 28 are triggered by clock pulses $f$ from a pulse source 29, and circuit 28 is, in the "Frequency" condition, reset by 26 periodically, so that its output signal has a 180° phase relative to the signal of the circuit 27. This phase difference is converted in phase detector 30 into a VCO control signal. The phase detector-oscillator control function is arranged so that a 180° phase shift means a control signal which tunes the VCO to the middle of the feedback loop tuning range.

The frequency locking situation will now be described.

When a desired frequency is observed on the display 4, the button 19 is pushed; thereby locking the memory 23 to the last value, say 11, for example, received from the divider circuit 20, and setting the device 3 to the "Bearing" condition, and out-of-lock circuit 25 is released. Bearing angle information is now transferred from the circuit 2 to the display 4. When the next sample of VCO-pulses arrives, the gate 31 is open and gates 15 and 16 are therefore controlled such that the gate 15 is open and the gate 16 is closed, and pulses start arriving at the divider circuit 24. The gates 15 and 16 now remain in the described state until 11 pulses are received and the comparator 18 detects the moment of equality between circuits 23 and 24. Upon this detection, the output of the comparator 18 switches to open gate 16 and close gate 15, so that the balance of the VCO-pulse sample is sent to the divider circuit 20. It will now be obvious that the normal state of this divider circuit is zero, meaning that if no frequency drift takes place in the VCO 5, the number of pulses in the pulse sample will not change, and the circuit 20 will pass through even full cycles. An output nul will, in this case, exist so that the phase shift of the divider circuits 27 and 28 will not be changed.

A frequency drift of the VCO signal is detected by the VCO pulse sample (and may be smaller or greater than the pulse sample already registered). If a smaller number occurs, this is detected in the divider circuit 20 as a negative number resulting in a 0-signal on the (0–1)-output. This 0-signal passes through gate 22 to the divider circuit 28, resulting in a phase shift of this circuit corresponding to (1/M)(360°) relative to the circuit 27. The phase detector 30 thereupon controls the VCO 5 to increase its frequency, and this sequence will be repeated until stability is reached, the arrangement actually constituting a controlled feedback circuit for frequency stabilization.

Similarly, if the VCO frequency increases, a greater VCO pulse sample is detected resulting in a positive number at the divider circuit 20. A 1-signal occurs on the (0–1)-output, and a (1/M)(360°) phase shift is effected in the division circuit 27, resulting in a control signal to the VCO in a sense to reduce its frequency.

It should now be re-emphasized that only the four least significant binary digits of the VCO-pulse signal are considered in the circuits 18, 20, 23 and 24. The divider circuit 20 is arranged such that its 16 different states have the following meaning:

| | |
|---|---|
| 1000 | No lock, circuit 25 is actuated |
| 1001 | |
| 1010 | |
| 1011 | |
| 1100 | Plus regulation, Output (0–1) actuates |
| 1101 | gate 22 |

| | |
|---|---|
| 1110 | |
| 1111 | No regulation, Output nul is actuated |
| 0000 | |
| 0001 | |
| 0010 | Minus regulation, Output (0-1) |
| 0011 | actuates gate 21 |
| 0100 | |
| 0101 | |
| 0110 | |
| 0111 | No lock, Circuit 25 is actuated. |

As will be seen from the foregoing, a frequency drift exceeding certain limits between two measuring periods will cause a reversion of the direction finder to its "Frequency" condition, because the out-of-lock circuit 25 is actuated under that condition. This circuit condition will remain until a new locking is effected as hereinabove described.

Actually, if the tuning device 6 is touched even slightly in the "Bearing" condition, this is likely to cause a reversion to the "Frequency" condition. The time constants concerned are such that it is conceivable however, to change the VCO frequency very rapidly between two updating periods so that one or more "no-lock" stages are passed without being detected. The VCO frequency will then be locked to a new frequency. This risk will be reduced as the number of bits in circuits 20 and 24 is increased. If the regulation areas are held constant, on say 12 positions as above, the no-lock areas will then be increased.

As long as the frequency drift between measurements is less than the mentioned limits, in the example −5 + 6, the VCO 5 will be controlled to deliver a constant frequency.

However, if the full frequency drift accumulated over several measurements reaches ±M (1/M)(360°) in terms of phase shift of the signal detected by the phase detector 30, this will cause an abrupt change of the output signal and revert the direction finder to its "Frequency" condition.

It should also be mentioned that between each measurement in the unlocked condition, i.e., between each pulse delivered from the timing circuit 17, the circuits 20 and 24 are automatically reset to zero.

The above detailed description of embodiments of the invention may be varied in many details without altering the scope of the inventive concept. The comparison circuits and VCO voltage control may, for example, be given other specific forms. Accordingly, it is not intended that the scope of the invention be regarded as limited by this description and the drawings, these being illustrative only.

What is claimed is:

1. A direction finding equipment adapted to operate in at least two modes of operation including a "Frequency" mode for tuning and a "Bearing" mode for making bearing measurements for received signal sources, comprising:

receiving means comprising a local oscillator responsive to manual frequency control to tune over a frequency band, said local oscillator being also responsive to a control voltage for varying its frequency over a fraction of said frequency band;

means for switching said equipment from either of said modes to the other;

first means responsive to said switching means and the frequency of said local oscillator for storing a signal representative of an initial frequency of said local oscillator substantially at the time of switching from said "Frequency" to said "Bearing" mode;

second means for comparing said stored frequency representing signal against a second frequency at least periodically representing signal corresponding to the actual frequency of said local oscillator during said "Bearing" mode, said second means operating to revert said equipment to said "Frequency" mode whenever said local oscillator frequency deviates from said initial frequency.

2. Apparatus according to claim 1 in which said frequency representing signals are digital codes and said apparatus includes means for digitally encoding measured bearing values and a digital display device controlled by said means for switching, to discretely display corresponding frequency and bearing values during said "Frequency" and "Bearing" modes respectively.

3. Apparatus according to claim 2 including sampling means operating periodically for corresponding sampling said local oscillator frequency, whereby said comparison is effected periodically.

4. Apparatus according to claim 3 including means responsive to said second means for releasing the memory of said first means whenever said second means controls said equipment to revert to said "Frequency" mode.

5. Apparatus according to claim 2 in which said first means is adapted to store only a predetermined number of least significant digits of said frequency representing signal at the time of said change to said "Bearing" mode, and in which said second means is adapted for comparing the corresponding digits of said second frequency representing signal, said predetermined number of least significant digits being chosen in accordance with the maximum expected frequency drift of said oscillator between successive measurements.

* * * * *